Oct. 13, 1959  B. RICHARDSON ET AL  2,908,069
METHOD OF MAKING SLEWING BEARINGS FOR CRANES AND THE LIKE
Filed Oct. 29, 1956  2 Sheets-Sheet 1
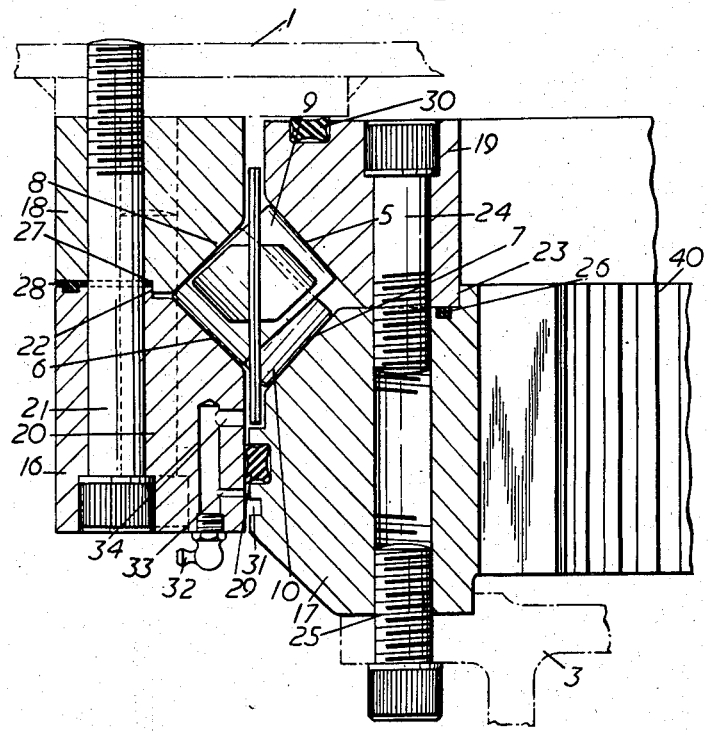
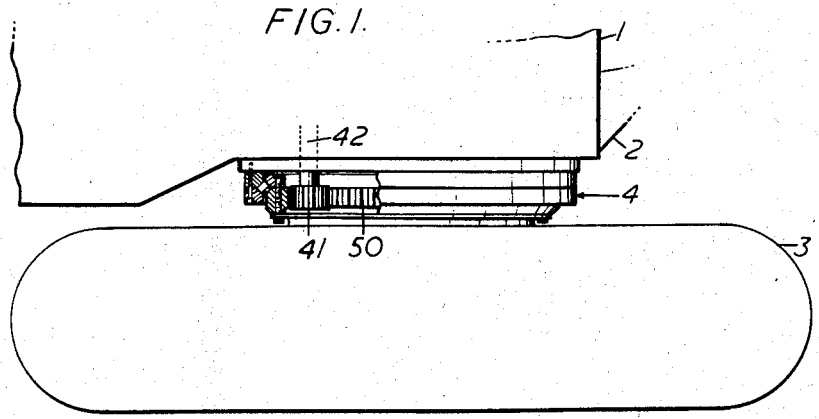
Inventors
Bert Richardson
Norman Brocklebank
By Holcomb, Wetherill & Brisebois Attorneys Oct. 13, 1959  B. RICHARDSON ET AL  2,908,069
METHOD OF MAKING SLEWING BEARINGS FOR CRANES AND THE LIKE
Filed Oct. 29, 1956  2 Sheets-Sheet 2
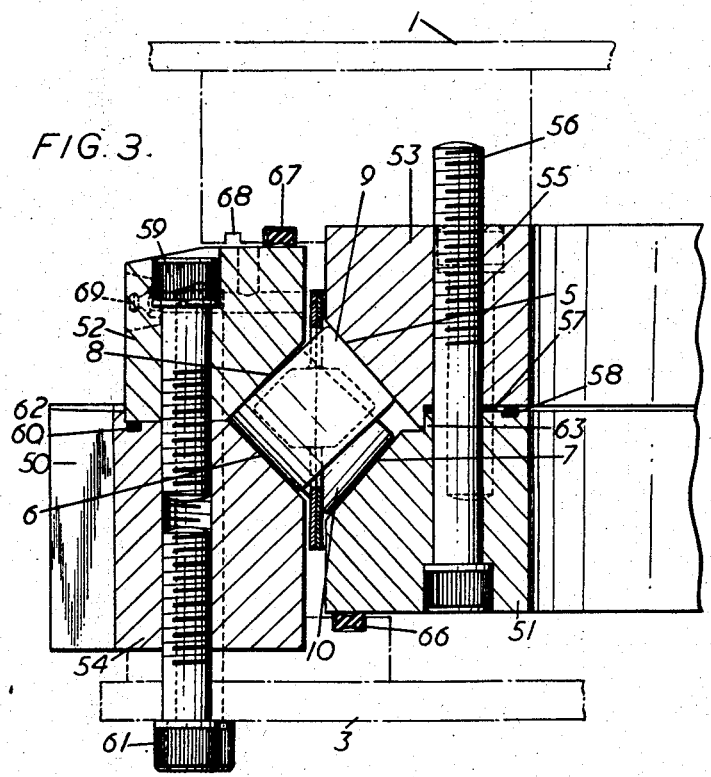
Inventors
Bert Richardson
Norman Brocklebank
By
Attorneys

United States Patent Office 2,908,069
Patented Oct. 13, 1959

2,908,069
METHOD OF MAKING SLEWING BEARINGS FOR CRANES AND THE LIKE

Bert Richardson and Norman Brocklebank, Hull, England, assignors to Priestman Brothers Limited, Hull, England, a British company Application October 29, 1956, Serial No. 618,924

2 Claims. (Cl. 29—148.4)

This invention relates to excavators and cranes and is particularly concerned with the method of making the bearing and pivotal mounting of the superstructure carrying the cab and jib upon an undercarriage or stationary structure.

In the conventional arrangement, the frame of the superstructure pivots on a centre pin or king post and is supported against tilting by horizontal rollers running in annular races concentric with the centre pin. The bearing upon which the superstructure rotates is subjected to a complex and varying system of forces including the dead weight of the excavator superstructure and front end equipment, the line of action of which varies with the type of front end equipment and, while the machine is working, producing varying tilting forces which also rotate as the superstructure is slewed. The digging action of excavators also produces horizontal loading and tilting moments.

According to the present invention the superstructure carrying the cab and the jib is pivoted to the under carriage or other support by means of a bearing comprising two coaxial sets of tapered rollers, each running between opposite pairs of race surfaces arranged so that when seen in section the four surfaces constitute a quadrilateral within which the rollers run and in which the rollers of one set are interspersed with those of the other set with the axes of the rollers in one set transverse to those in the other and oblique to the vertical.

In general the rollers of one set will alternate with those in the other, but two or three or even more rollers of one set may follow one another.

By reason of the operating conditions which obtain in a crane or excavator, the use of such a bearing has unexpected advantages in that instead of having to grind the race surfaces after they have been hardened, it is possible to machine them initially and to carry out the hardening process after the machining is complete. With normal bearings this is not possible owing to the slight distortions which may be caused by the hardening process. With a bearing for use in a crane or excavator, however, where the speeds of rotation are relatively low, minor distortions can be tolerated. Preferably, however, the race surfaces are each formed on separate bearing rings secured together vertically in pairs. Any minor distortions of the individual rings therefore tend to be reduced to negligible dimensions when one ring is forced into contact with the other ring of the pair after the insertion of the rollers.

An example of excavator or crane in accordance with the invention will now be described in more detail with reference to the accompanying drawings in which:

Figure 1 is an outline view of part of the excavator or crane showing a slewing bearing partly in section;

Figure 2 is a sectional view of the bearing shown in Figure 1 to an enlarged scale;

Figure 3 is a sectional view corresponding to Figure 2 of a modified form of bearing; and Figure 4 is a perspective view of the bearing of Figure 3 with parts broken away.

In the outline view of Figure 1 the excavator or crane has a superstructure carrying the cab, part of which is shown at 1, and the jib, one end of which is shown at 2. These parts are mounted on the undercarriage 3 by means of a slewing bearing indicated generally at 4 and illustrated in more detail in Figure 2. The bearing includes two pairs of opposite race surfaces 5 and 6 and 7 and 8. Tapered rollers 9 run between the race surfaces 5 and 6, while tapered rollers 10 run between the race surfaces 7 and 8. These four surfaces thus constitute a quadrilateral with the axes of the rollers in one set transverse to those in the other. As shown, the axes of each of the two sets of rollers are at approximately 45° to the vertical, but this angle is not critical and may vary with the operating conditions.

The four race surfaces 6, 7, 8 and 5 are formed respectively on bearing rings 16, 17, 18 and 19 which are secured together in pairs. The rings 16 and 18 are secured together by screws 20 seen in dotted outline in Figure 2 and also by further screws 21 which, in addition, secure part of the superstructure seen in dotted lines at 1 to the bearing ring 18. The rings 17 and 19 are secured together by screws 24, while further screws 25 secure the ring 17 to the undercarriage 3. The four rings are each produced as forgings or castings which are first roughed out and then have their race surfaces accurately machined by means of electronic copying. When the machining is complete the race surfaces are flame-hardened and tempered. It is found in practice that the hardness of the surfaces should lie in the region of 52 to 56 on the Rockwell "C" scale, the depth of hardening being strictly controlled.

The two pairs of rings are spigoted together as seen at 22 and 23 to prevent slipping or "fidget" between the rings when the bearing is unevenly loaded. The rings 17 and 19 are screwed firmly into contact with one another, a small sealing ring 26 being seated in a corresponding recess. The rings 16 and 18, however, are separated by means of steel shims 27 arranged between the screws, a small sealing ring 28 being located in a corresponding recess. In assembly shims of the "peelable" type are used which can be inserted without the removal of the ring. After the rings have been adjusted so as just to be in contact with the rollers, one or more shims are then removed until the required pre-loading stress is produced on the rollers. The thickness of shims removed to produce this pre-loading may vary between three and fifteen thousandths of an inch according to the design of bearing and the nature of the loading. This pre-loading is a most important factor in the design of the bearing and prevents the rollers reacting on the race paths to produce pitting or "brinelling" due to vibration and shock loading. When the preloading has been achieved the bearing is dismantled, cleaned, packed with high pressure grease and reassembled with robust permanent shims of the required thickness.

Further somewhat larger sealing rings 29 and 30 are located in recesses in the side of the ring 17 and in the top of the ring 19 respectively. The sealing rings have slightly concave sides and when the bearing is assembled are maintained under slight pressure to maintain an effective grease seal against the side of the ring 16 and the underside of the superstructure 1. In addition to the seal 29, a grease-filled labyrinth 31 is provided as an additional precaution against the entry of water and dirt to the bearing. Grease is pumped in through a series of lubrication points 32. Initially the grease passes through an opening 34 filling any empty spaces between the rollers and the upper side of seal 29, Figure 2. When resistance is encountered the grease will travel through opening 33 to fill the labyrinth 31.

As previously mentioned, the rollers 9 and 10 are tapered and are held by means of cages made in sections so that each roller is in effect contained in a separate cage. The cages are seen in more detail in the view of Figure 4 which shows a slightly modified type of bearing.

Each cage consists of an approximately square body consisting of two plates spot welded together and formed with a central opening 36 for the reception of the roller which is held in position by means of lugs 37. The individual sections abut against one another end to end, as seen in Figure 4, and this facilitates the ready removal or rearrangement of individual rollers.

The ring 17 is formed with internal teeth 40 which mesh with a slewing pinion 41 (seen in Figure 1), mounted on a driven shaft 42, extending downwardly from the cab 1. When the pinion 41 is driven it runs around the ring of teeth 40 causing the superstructure to rotate, and thus provide the required slewing motion of the superstructure.

The modified bearing of Figures 3 and 4 differs from that of Figures 1 and 2 primarily in that the ring of teeth for engagement with the slewing pinion is formed externally, as seen at 50 instead of internally as in the previous construction. This leads to a modification in the general design of the four bearing rings but the race surfaces and the rollers running between them are identical with those shown in Figure 2 and are indicated by the same reference numerals. The race surfaces 5, 6, 7 and 8 are formed on bearing rings 53, 54, 51 and 52 respectively, the ring 54 carrying the teeth 50, as previously mentioned.

The bearing rings 51 and 53 are held together by screws shown dotted at 55 and by further screws 56 which also serve to secure the superstructure to the bearing ring 53. The bearing rings are separated by segmental shims 57 corresponding to the shims 27 of Figure 2, and by a small sealing ring 58.

The bearing rings 52 and 54 are held together by screws 59 being separated by a small sealing ring 60. Further screws 61 secure the bearing ring 54 to the undercarriage 3. The pairs of rings are spigoted together at 62 and 63 to prevent "fidget."

Further sealing rings 66 and 67 correspond with the rings 29 and 30 shown in Figure 2. In this latter case, however, the sealing rings are accommodated in recesses in the undercarriage 3 and the superstructure 1 respectively so that no machining of the bearing rings is required. In addition to the sealing ring 67, a grease-packed labyrinth 68 is provided, with is lubricated from points 69 in the same way as the labyrinth 31 of Figure 2.

We claim:
1. The method of manufacturing a roller bearing for supporting the superstructure of an excavator upon its undercarriage, said bearing being of the type which comprises first and second bearing rings positioned vertically above one another and third and fourth bearing rings positioned vertically above one another inside said first and second bearing rings, said first and third bearing rings being shaped to interfit with said second and fourth bearing rings respectively by means of a spigot connection, each said bearing ring having an annular race surface, the four of said race surfaces, when seen in cross-section, constituting a quadrilateral in which each pair of diametrically opposed race surfaces are inclined to one another at a small angle, said method comprising the steps of first completely machining said race surfaces on each ring and then hardening said rings, interfitting said rings with said rollers between said races and a set of readily removable shims between one pair of superposed rings, and then removing at least one of said shims while urging said superposed rings together to produce a preloading stress on said rollers.

2. The method claimed in claim 1 in which the shims initially positioned between the rings are of the peelable type, said roller bearing is disassembled after said preloading stress has been atttained, permanent shims are substituted for the remaining peelable shims, and the bearing is reassembled.

References Cited in the file of this patent

UNITED STATES PATENTS

| | | |
|---|---|---|
| 1,235,116 | Coppage | July 31, 1917 |
| 2,040,741 | Hoke | May 12, 1936 |
| 2,220,027 | Scott | Oct. 29, 1940 |
| 2,313,084 | Manly | Mar. 9, 1943 |
| 2,545,122 | Thompson | Mar. 13, 1951 |
| 2,628,137 | Ashton | Feb. 10, 1953 |
| 2,708,767 | Dean | May 24, 1955 |

FOREIGN PATENTS

| | | |
|---|---|---|
| 659,580 | Great Britain | Oct. 24, 1951 |